(12) United States Patent
Jagana et al.

(10) Patent No.: US 7,376,421 B2
(45) Date of Patent: May 20, 2008

(54) DELAYED MOBILE NODE REGISTRATION WITH HOME AGENT

(75) Inventors: Venkata R. Jagana, Portland, OR (US); Krishna Kumar, Kerala, IN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 11/197,800

(22) Filed: Aug. 6, 2005

(65) Prior Publication Data

US 2007/0030822 A1 Feb. 8, 2007

(51) Int. Cl.
*H04Q 7/20* (2006.01)

(52) U.S. Cl. ............... 455/433; 455/432.1; 455/432.3; 455/435.1; 455/436; 455/437; 455/442; 455/445; 370/331; 370/401

(58) Field of Classification Search .. 455/432.1–432.3, 455/433–434, 435.1–435.3, 436–446; 370/338, 370/349, 352, 401, 328–329, 331, 400
See application file for complete search history.

(56) References Cited

U.S. PATENT DOCUMENTS

| | | | |
|---|---|---|---|
| 6,567,664 B1 | 5/2003 | Bergenwall et al. | |
| 6,654,359 B1 * | 11/2003 | La Porta et al. | 370/328 |
| 6,728,539 B2 | 4/2004 | Kuwahara | |
| 6,763,007 B1 * | 7/2004 | La Porta et al. | 370/331 |
| 6,987,771 B2 * | 1/2006 | Shimizu et al. | 370/401 |
| 7,002,936 B2 * | 2/2006 | Agrawal et al. | 370/329 |
| 7,039,028 B2 * | 5/2006 | Chen et al. | 370/331 |
| 7,075,910 B2 * | 7/2006 | Chen et al. | 370/331 |
| 7,174,166 B2 * | 2/2007 | Song et al. | 455/436 |
| 2002/0085518 A1 | 7/2002 | Lim | |
| 2002/0191560 A1 * | 12/2002 | Chen et al. | 370/331 |
| 2004/0208144 A1 * | 10/2004 | Vinayakray-Jani | 370/331 |
| 2005/0101321 A1 * | 5/2005 | Ikeda et al. | 455/435.1 |
| 2005/0286471 A1 * | 12/2005 | Yang et al. | 370/331 |

* cited by examiner

*Primary Examiner*—Tuan A. Tran
(74) *Attorney, Agent, or Firm*—Abdy Raissinia

(57) ABSTRACT

Mobile node registration with the home network of the mobile node is delayed when the mobile node moves to a foreign network. The mobile node has a home network in which the mobile node has a home address. In response to the mobile node moving to a foreign network (such as by being turned on in the foreign network), the mobile node receives a care-of address. Where the mobile node has no ongoing communication sessions, the mobile node waits to register its care-of address with its home agent in the home network until the mobile node initiates a communication session within the foreign network, which may not ever occur. The mobile node by registering the care-of address with the home agent informs the home agent where to forward data sent to the mobile node's home address.

11 Claims, 6 Drawing Sheets

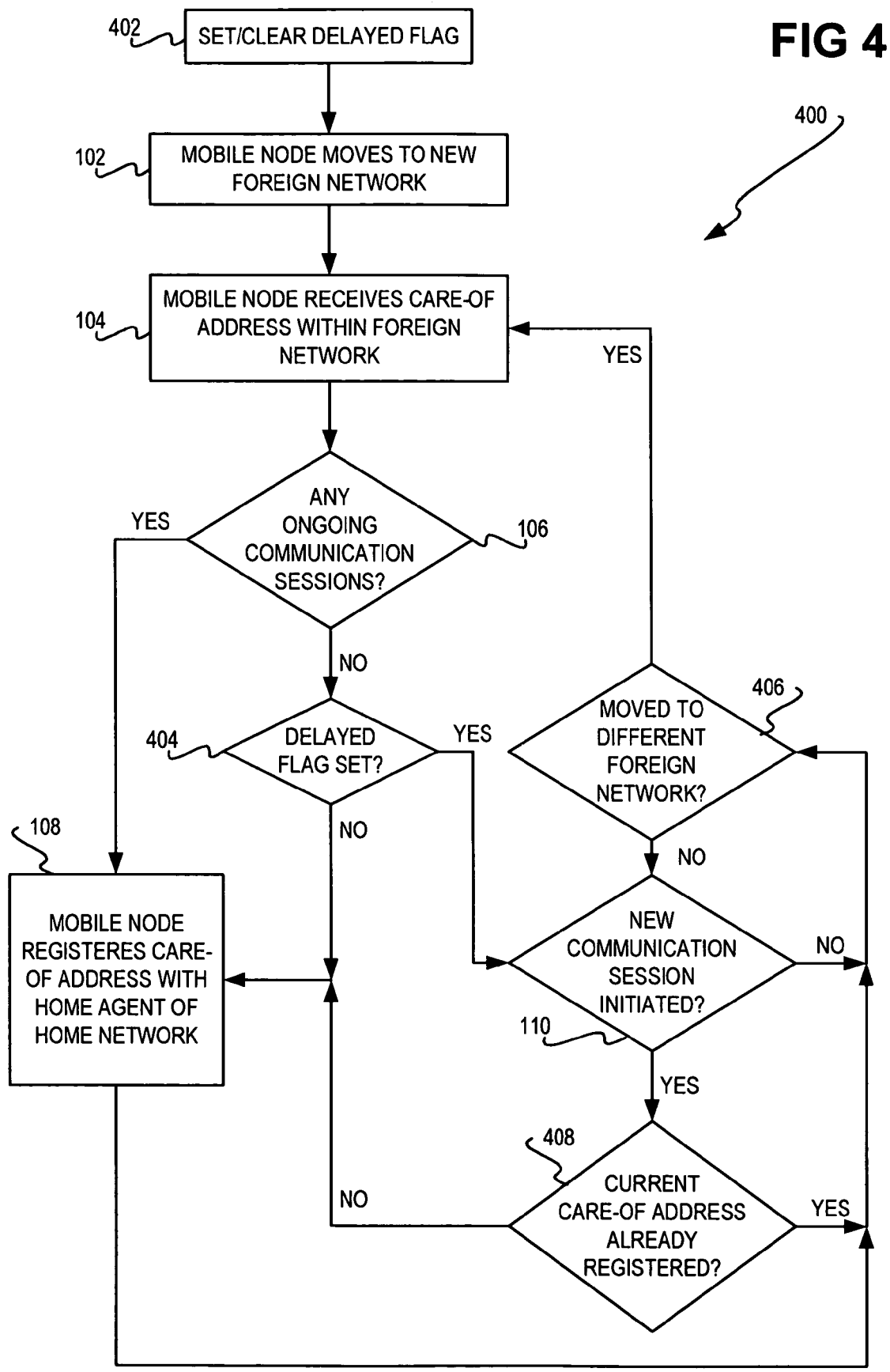

DELAYED MOBILE NODE REGISTRATION WITH HOME AGENT

FIELD OF THE INVENTION

The present invention relates generally to mobile nodes having home agents with which they are to register when entering foreign networks, and more particularly to such mobile nodes delaying registration with their home agents when entering foreign networks.

BACKGROUND OF THE INVENTION

Traditionally, resources, such as computing devices and other types of devices, which had Internet connectivity were stationary while connected to the Internet. For instance, a desktop computer that is able to connect to the Internet is deployed at a given location for an indefinite period of time. Even a laptop computer, which is considered a portable device, is usually stationary while connected to the Internet. That is, the laptop computer may be moved from one location to another, but while the laptop computer is connected to the Internet, it typically remains at a given location.

More recently, other types of resources, such as cellular and mobile phones, personal digital assistant (PDA) devices, and other types of devices, including laptop computers, have Internet connectivity in which the resources are mobile while connected to the Internet. For example, a mobile phone may be connected to the Internet, while the phone is being moved from one location to another. The user of the mobile phone may be in a car, a train, or simply walking around.

To provide for Internet connectivity in which resources are mobile while connected to the Internet, a given mobile resource, which is also referred to as a mobile node herein, may have a home address within a home network, and receive care-of addresses while in foreign networks, which are networks other than the home network. For example, a mobile phone may have a home cell, or network.

When the mobile phone is transported to a different cell, which is a foreign network, the mobile phone receives a care-of address that it can temporarily use while in this foreign network. The mobile phone immediately registers this care-of address with its home agent, which is a computing device within the home network. The home agent forwards communications received at the mobile phone's home address to the mobile phone's care-of address while the mobile phone is in the foreign network.

This approach for providing Internet connectivity to mobile resources does not scale very well, however, when there are tens of thousands, if not hundreds of thousands or millions, of mobile resources constantly moving among different foreign networks. Regardless of whether a mobile phone currently has an ongoing communication session or not, the mobile phone always immediately registers with its home agent when the mobile phone travels to a new foreign network (or when it is turned on in a foreign network). A given home agent may be the home agent for a large number of devices, a majority of which may be traveling within foreign networks at any given time.

Thus, the home agent may be constantly receiving care-of address registrations from mobile resources that are traveling within foreign networks, even if most of these resources do not currently have ongoing communication sessions that require the home agent to immediately know the care-of addresses of the mobile resources. The home agent may become overburdened fairly quickly. Furthermore, the networks themselves can be overburdened, with many mobile resources constantly registering with their home agents as the resources traverse different foreign networks. That is, the bandwidth of the networks may be consumed by registration communications, as opposed to, for instance, communications.

For these and other reasons, therefore, there is a need for the present invention.

SUMMARY OF THE INVENTION

The present invention relates to delaying mobile node registration with a home network of the mobile node when the mobile node moves to a foreign network. In a method of the present invention, the mobile node has a home network in which the mobile node has a home address. In response to the mobile node moving to a foreign network, the mobile node receives a care-of address. Where the mobile node has no ongoing communication sessions, the mobile node waits to register its care-of address with its home agent in the home network until the mobile node initiates a communication session within the foreign network, which may not ever occur, such that registration never occurs. The mobile node registering the care-of address with the home agent informs the home agent where to forward data sent to the home address in accordance with a communication session.

A system of the present invention includes at least a mobile node, a home network of the mobile node in which the mobile node has a home address, a home agent for the mobile node within the home network, and one or more foreign networks. The mobile node receives a care-of address each time it moves to a foreign network. The mobile node has to register this care-of address with its home agent in order to receive data sent to the home address of the mobile node. However, the mobile node delays registration of the care-of address with its home agent where no ongoing communication sessions exist upon movement to the foreign network, until a communication session is subsequently, if ever, initiated by the mobile node while the mobile node is still in that foreign network.

An article of manufacture of the present invention includes a computer-readable medium, and means in the medium. The computer-readable medium may be a recordable data storage medium, a modulated carrier signal, or another type of computer-readable medium. The means is for waiting to register a mobile node with a home agent of a home network, upon movement of the mobile node to a foreign network, until the mobile node initiates a communication session within the foreign network. Thus, the mobile node is not immediately registered with the home agent upon moving to the foreign network, unless the mobile node has one or more ongoing communication sessions upon moving to the foreign network.

A mobile node of the present invention includes a communication mechanism and a registration mechanism. The communication mechanism is to communicate with a home agent of a home network of the mobile node, to receive a care-of address when the mobile node is moved to a foreign network, and to conduct communication sessions. The registration mechanism is to delay registration of the care-of address with the home agent until a communication session is initiated while the mobile node is in the foreign network, unless the mobile node has one or more current ongoing communication sessions.

Embodiments of the invention provide for advantages over the prior art. For instance, mobile nodes are likely not to be engaging in ongoing communication sessions when they move to new foreign networks. Therefore, while the mobile nodes are not engaging in a communication with another node while in the foreign network, there is no need for the mobile nodes to register with the home agents of their home networks. The mobile nodes, in other words, do not register with the home agents immediately upon moving to foreign networks. Rather, the mobile nodes only register with the home agents later, if and when communication sessions are subsequently initiated. However, if the mobile nodes have current ongoing communication sessions when they move to a foreign network, they immediately register their assigned care-of addresses with their home agents. Furthermore, if the mobile nodes exit their current foreign networks without having ever initiated communication sessions, then they will never have to register with their home agents from their current foreign networks.

Thus, the embodiments of the invention can decrease the registration-oriented traffic within the networks, preventing the networks from becoming overburdened, as well as preventing the home agents from becoming overburdened. For example, a given mobile node may travel from its home network, to a number of different foreign networks in succession, and then back to its home network, while never establishing a communication session in any of these networks. In the prior art, each time this mobile node travels to a different foreign network, it has to register with the home agent of its home network. However in this scenario, according to the present invention, the mobile node never registers with the home agent when traveling to a different foreign network, because no communication session is ongoing, nor is one ever initiated.

Such a decrease in registration-oriented traffic within the networks frees up the networks for other types of traffic. Furthermore, such a decrease in registration-oriented traffic means that the home agents may be able to handle more mobile nodes, since only the mobile nodes that are currently engaged in ongoing communication sessions will be registering back with the home agents upon moving to foreign networks. Still further aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a flowchart of a method performed by a mobile node when moving among different foreign networks, and which is more detailed than but consistent with the method of FIG. 1.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
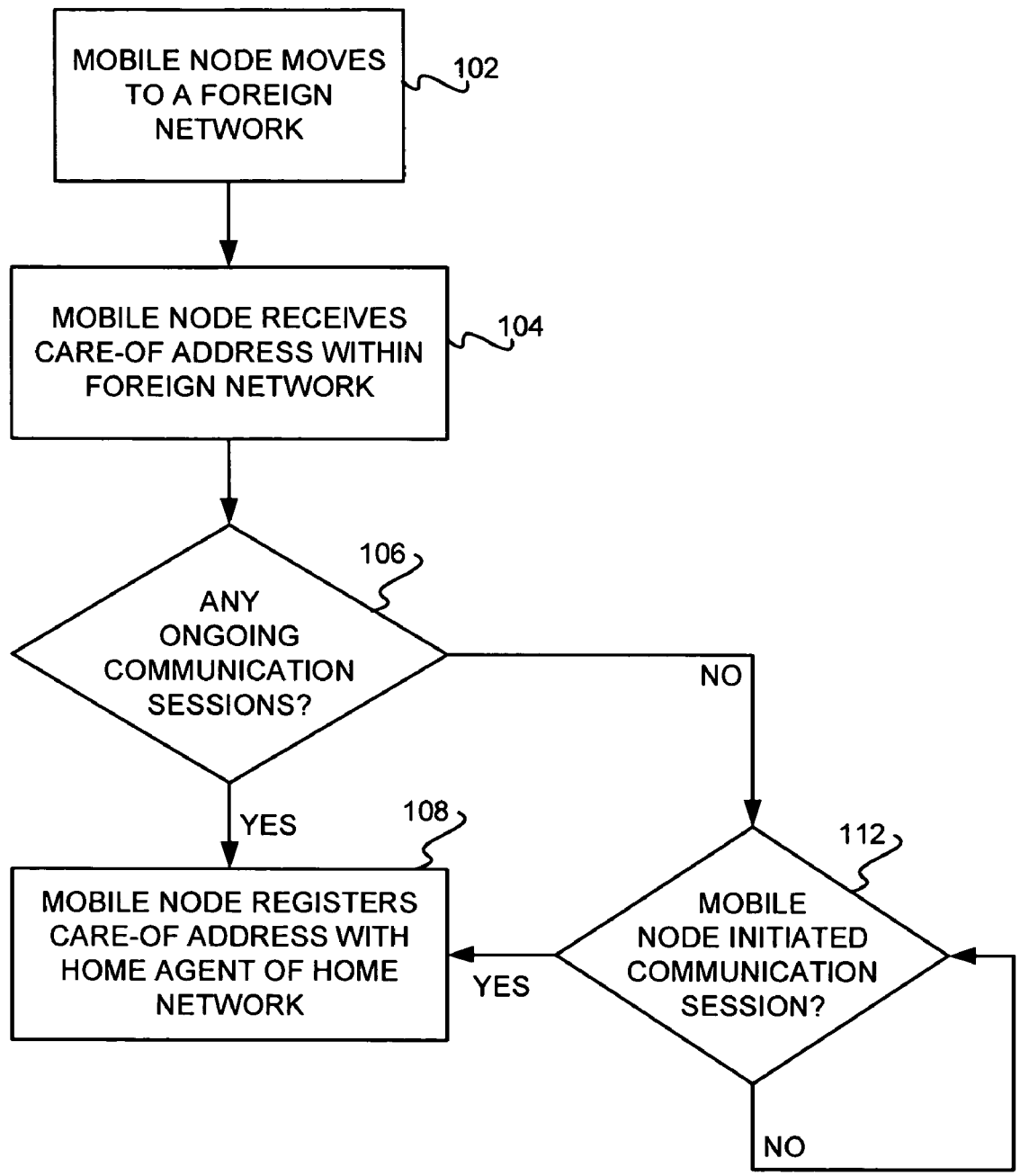
FIG. 1 is a flowchart of a method performed by a mobile node when moving among different foreign networks, according to an embodiment of the invention, and is suggested for printing on the first page of the patent.

FIG. 1 shows a method 100 that is performed by a mobile node when moving to a foreign network, according to an embodiment of the invention. The mobile node has a home network in which the mobile node has a home address, which may be a mobile Internet Protocol (IP) address. The mobile node further has a home agent in the home network.

The mobile node moves, or travels, to a foreign network (102). The foreign network is a network other than the home network of the mobile node. When moving to the foreign network, the mobile node receives a care-of address (104). The care-of address of the mobile node is a temporary forwarding address, such as another mobile IP address, to which data sent to the home address of the home node is to be forwarded by the home agent. The care-of address of the mobile node may also be the address by which direct communication with the mobile node can be established while the mobile node is in the foreign network. Thus, in order for the home agent to know the current care-of address of the mobile node to which to forward data sent to the home address of the mobile node, the mobile node has to register its current care-of address with its home agent.

If the mobile node has any current ongoing communication sessions when it moves to the foreign network (106), then the mobile node immediately registers its assigned care-of address with the home agent of the home network (108). This is accomplished so that the home agent is informed where to continue to send data sent to the home address of the mobile node, enabling the mobile node to seamlessly roam among different networks while maintaining its current ongoing communication sessions. A communication session may be an Internet web site browsing session, an instant message (IM) communication session, data, video and/or audio, a voice telephone call, and/or another type of communication session.

However, if the mobile node does not have any current ongoing communication sessions when it moves to the foreign network (106), then the mobile node does not immediately register its assigned care-of address with the home agent of the home network. This is because the home agent does not need to immediately be informed as to where to forward data sent to the home address of the mobile node, since the mobile node is not currently receiving or sending data in accordance with a current ongoing communication session. Rather, only when the mobile node initiates a communication session (112), does the mobile node later register its care-of address with the home agent of the home network (108). This later registration is necessary because when the mobile node does initiate a communication session, the home agent needs to know the care-of address to which to forward data sent to the home address of the home node.

The method 100 is repeated each time the mobile node enters a new foreign network. The mobile node may enter a foreign network from its home network, or from a different foreign network. The mobile node may further enter a foreign network by being turned on within the foreign network. It is noted that if there are no ongoing communication sessions when the mobile node enters a foreign network, and the mobile node never initiates a communication session while in the foreign network, then the mobile node never registers its care-of address with the home agent of the home network. Rather, the mobile node continually repeats, or "spins" on, part 112 of the method 100, such that it never registers with the home agent of the home network. When the mobile node is moved to a different foreign network, the method 100 is thus performed anew, with the mobile node never having performed registered its care-of address in the previous foreign network with the home agent of the home network.

As a result, a mobile node traversing different foreign networks, while never initiating a communication session or maintaining an ongoing communication session, does not overburden the home agent or the networks themselves with care-of address registration traffic. One consequence of the mobile node not immediately registering its care-of address when entering a new foreign network, however, is that the mobile node must always be the initiator of any communication sessions with other nodes. The other nodes cannot initiate a communication session with the mobile node in question, because until the mobile node has registered its care-of address with the home agent of the home network, the home agent does not know where to forward data sent to the home address of the mobile node. In other words, the mobile node is always a client node, and never a server node, when performing the method 100.

Technical Background

Figure 2:
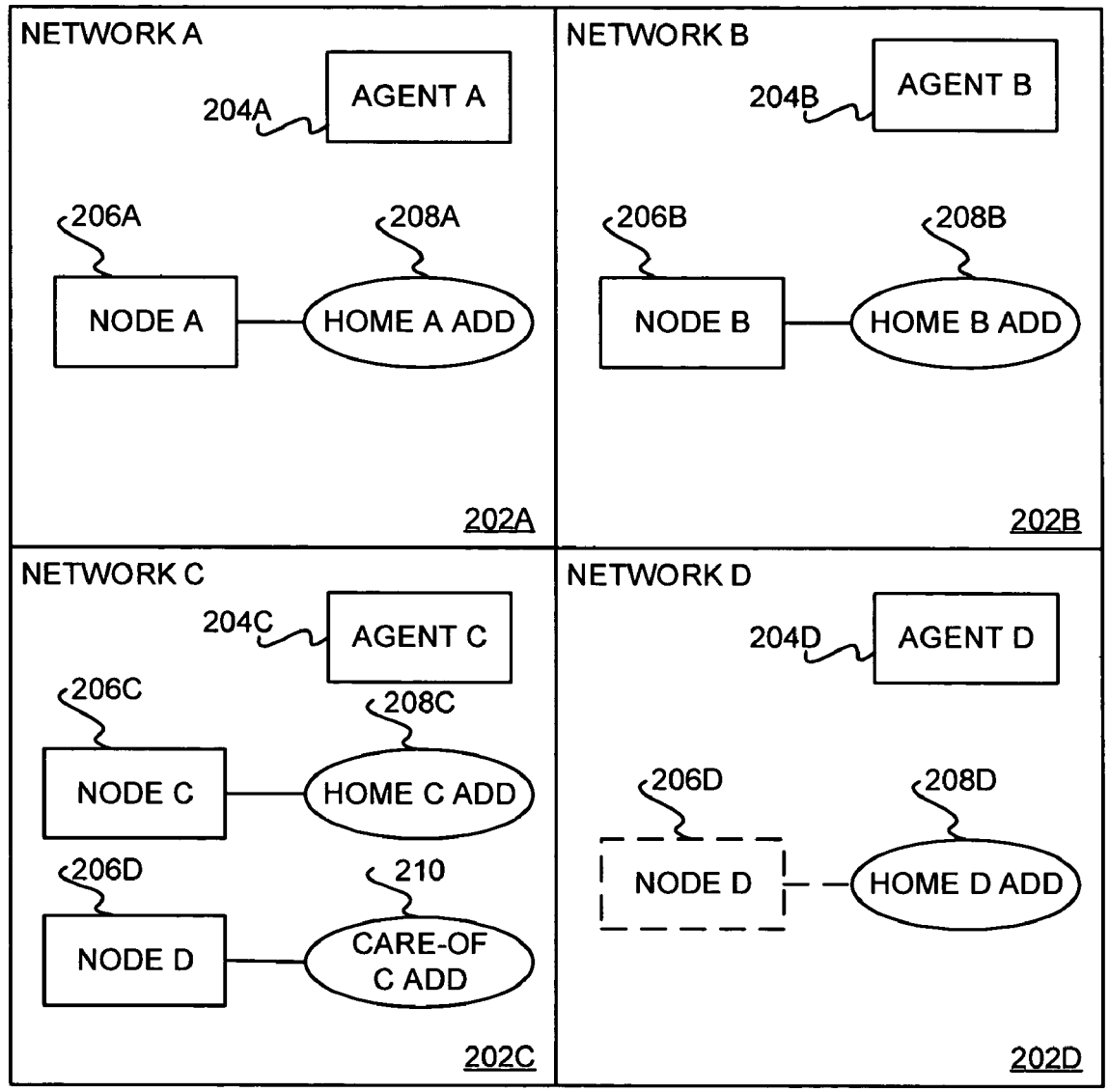
FIG. 2 is a diagram of a representative system having a number of networks that can be traversed by mobile nodes, in accordance with which embodiments of the invention may be practiced.

FIG. 2 shows a representative system 200 in which mobile nodes are able to maintain communication systems while moving across different networks, and in conjunction with embodiments of the invention may be implemented. The system 200 includes networks 202A, 202B, 202C, and 202D, collectively referred to as the networks 202. While just four networks 202 are depicted in FIG. 2, in actuality there may be hundreds, thousands, or more of the networks 202. The networks 202 may be individual cells of a cellular network that mobile or cellular phones and phone devices can traverse, and in which such phones and devices can send and receive communications.

The networks 202 have agents 204A, 204B, 204C, and 204D, which are collectively referred to as the agents 204. The agents 204 are devices, such as computing devices, which are responsible for data sent to and received from mobile nodes temporarily located within their respective networks 202, as well as data sent to and received from mobile nodes that have as their home networks the networks 202, as will be described. A mobile node is mobile in that it is able to traverse the networks 202, such that it is capable of moving or traveling to different of the networks 202. A mobile node is currently located in a given network if it is able to send and receive data within that network. Thus, as a mobile node physically moves, it is able to send data to and receive data from different of the agents 204, such that it is in different of the networks 202. The networks 202 are depicted in FIG. 2 as non-overlapping, but may overlap to some extent to guarantee that a mobile node is always able to communicate with at least one of the agents 204.

Each of the networks 202 may have a number of mobile nodes, such as mobile or cellular phones, personal digital assistant (PDA)-type devices, as well as other types of devices, which are based in that network. The network that a given mobile node is based in is referred to as the home network of the mobile node, whereas the other networks are foreign networks in relation to that mobile node. For example, the mobile node 206A is based in the network 202A, such that the network 202A is the home network for the node 206A, and the other networks 202B, 202C, and 202D are foreign networks for the node 206A. The agent 204A is further the home agent of the mobile node 206A. The mobile node 206A has a home address 208A within its home network 202A that is maintained by the agent 204A. When the mobile node 206A is in its home network 202A, data sent to the home address 208A is forwarded to the mobile node 206A by the agent 204A.

In the same way, the mobile node 206B is based in the network 202B, such that the network 202B is the home network for the node 206B, the agent 204B is the home agent of the mobile node 206B, and the mobile node 206B has a home address 208B within the network 202B. The networks 202A, 202C, and 202D are thus foreign networks for the mobile node 206B. Likewise, the mobile node 206C is based in the network 202C, such that the network 202C is the home network for the node 206C, the agent 204C is the home agent of the mobile node 206C, and the mobile node 206C has a home address 208C within the network 202C. The networks 202A, 202B, and 202D are foreign networks for the mobile node 206C.

The mobile node 206D, however, is not currently located in its home network 202D in the example of FIG. 2, but rather is currently located in the foreign network 202C. The mobile node 206D still has a home address 208D within the home network 202D, which is maintained by its home agent 204D. (That the mobile node 206D has the network 202D as its home network is indicated by the dotted-lined box 206D' in FIG. 2.) The mobile node 206D has also received a temporary care-of address 210. The mobile node 206D registers this temporary care-of address 210 with its home agent 204D of its home network 202D. Such registration is delayed in some embodiments of the invention, as has already been described generally, and as is described in more detail later in the detailed description. Data sent to the home address 208D of the mobile node 206D are received by the home agent 204D, which forwards the data to the temporary care-of address 210 of the mobile node 206D.

Delayed Registration Example

Figure 3A:
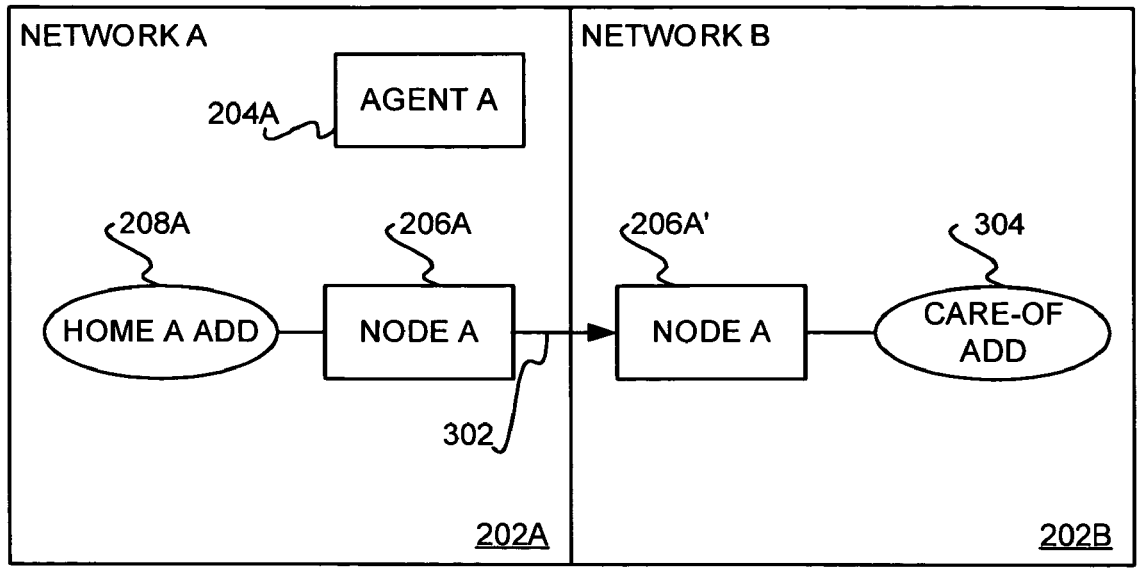
FIGS. 3A, 3B, 3C, and 3D are diagrams depicting an example of delayed mobile node registration with a home agent, when the mobile node moves to a new foreign network, according to an embodiment of the invention.

FIGS. 3A, 3B, 3C, and 3D depict an example of delayed registration of the mobile node 206A with its home agent 204A, according to an embodiment of the invention. In FIG. 3A, the mobile node 206A has a home address 208A within its home network 202A, such that it also has as its home agent the agent 204A. The mobile node 206A then moves or travels to the foreign network 202B, as indicated by the arrow 302, such that the mobile node 206A while in the foreign network 202B is referred to as the mobile node 206A'. The mobile node 206A' receives a temporary care-of address 304. However, the mobile node 206A' does not have any current ongoing communication sessions, and therefore does not register this temporary care-of address 304 with the home agent 204A.

Figure 3B:
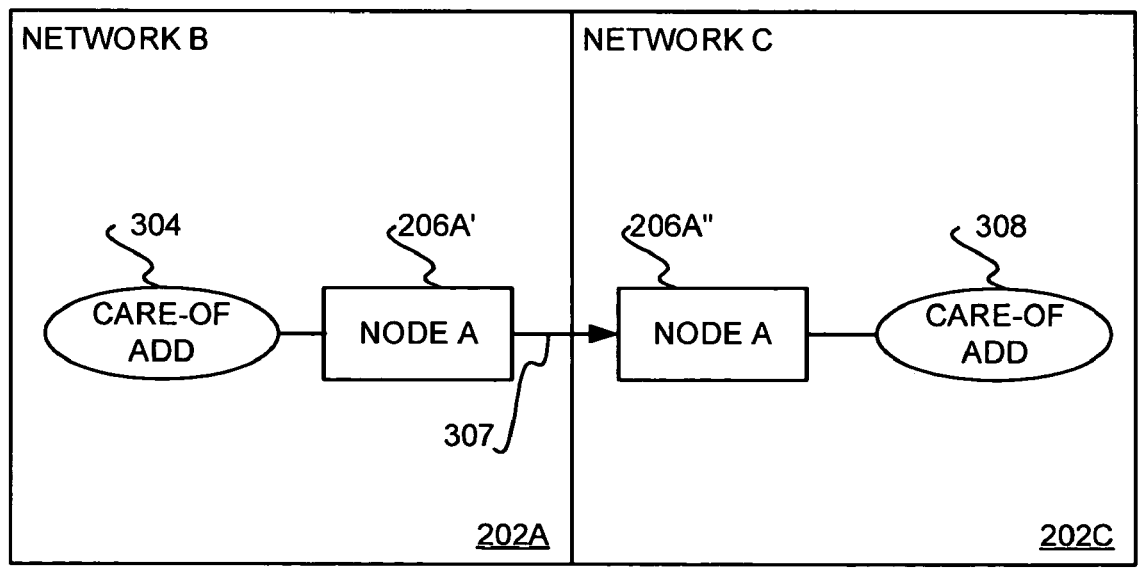

In FIG. 3B, the mobile node 206A' moves or travels to the foreign network 202C, as indicated by the arrow 307, such that the mobile node 206A' while in the foreign network 202C is referred to as the mobile node 206A". It is noted that the temporary care-of address 304 that the mobile node 206A' had while in the network 202B was never registered with the home agent 204A. This is because the mobile node 206A' did not have any current ongoing communication sessions when first entering the network 202B, and did not initiate any new communication sessions while in the network 202B. Thus, the networks 202A and 202B do not have their bandwidth wasted on the registration of the temporary care-of address 304. Furthermore, the home agent 204A does not have to be overburdened with the registration of the care-of address 304.

Figure 3C:
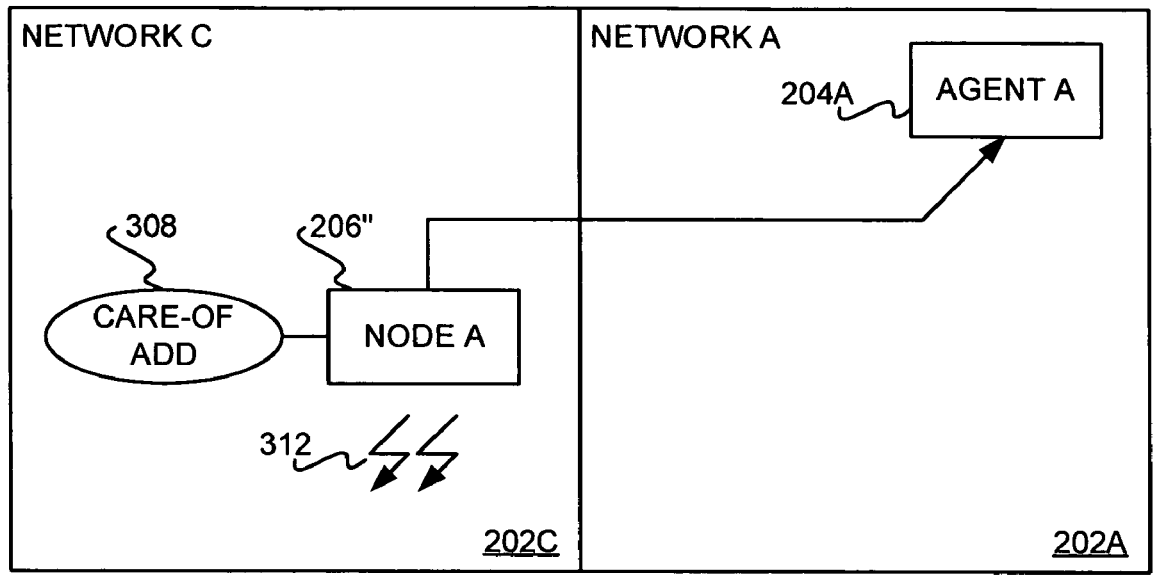

After entering the network 202C, the mobile node 206A" receives a new temporary care-of address 308. However, the mobile node 206A" does not have any current ongoing communication sessions, and therefore does not immediately register the temporary care-of address 308 with the home agent 204A. In FIG. 3C, the mobile node 206A", still in the foreign network 202C, has initiated a communication session, as indicated by the arrows 312. At this time, then, the mobile node 206A" registers the temporary care-of address 308 with the home agent 204A of the home network 202A, as indicated by the arrow 314. Registering the temporary care-of address 308 with the home agent 204A informs the home agent 204A where to forward data sent to the home address 208A of the mobile node 206A" (not shown in FIG. 3C).

Figure 3D:
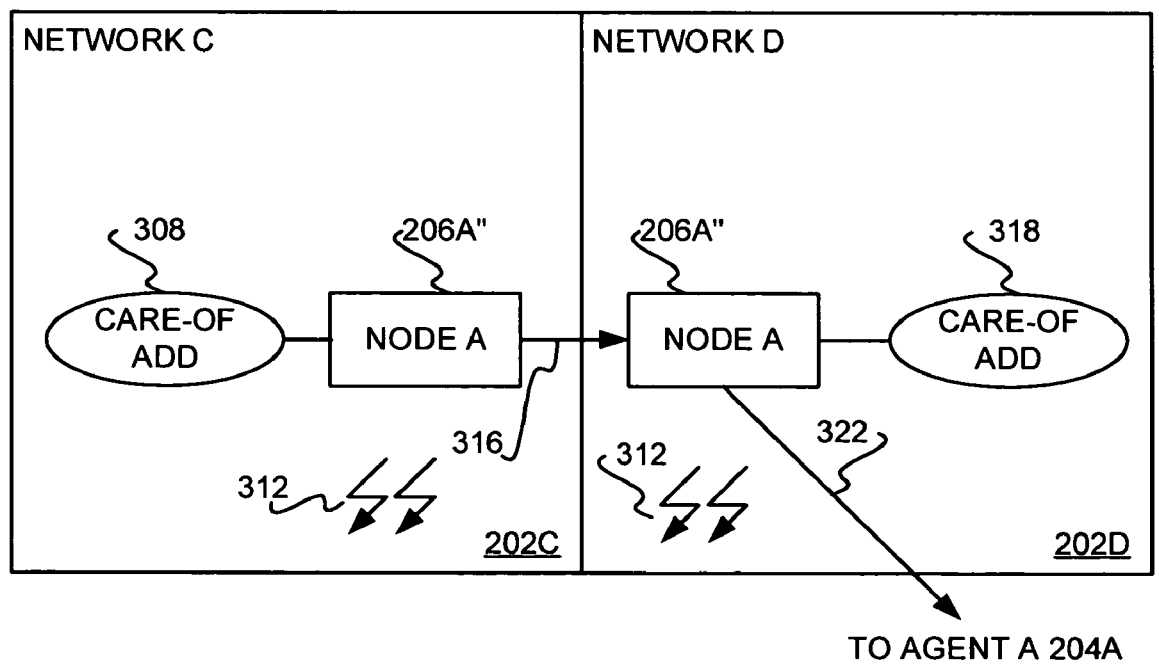

In FIG. 3D, the mobile node 206A", while still maintaining the communication session indicated by the arrows 312, moves or travels to the foreign network 202D, as indicated by the arrow 316, such that the mobile node 206A" while in the foreign network 202D is referred to as the mobile network 206A'". After entering the network 202D, the mobile node 206A'" receives a new temporary care-of address 318. Because the mobile node 206A'" has a current ongoing communication session, as indicated by the arrows 312, it immediately registers its new temporary care-of address 318 with the home agent 204A, as indicated by the arrow 322. This registration allows the mobile node 206A'" to continue to receive communications sent to the home address 208A of the mobile node 206A'" (not shown in FIG. 3D).

Detailed Method

FIG. 4 shows a method 400 that is performed by a mobile node when moving among different foreign networks, according to an embodiment of the invention. The method 400 is more detailed than, but consistent with, the method 100 of FIG. 1. Like-numbered parts or boxes between FIG. 1 and FIG. 4 are performed at least substantially identically in the method 400 as they have been described in relation to the method 100 of FIG. 1.

The method 400 begins with a delayed flag being set or cleared (402), such as by the user of the mobile node that is performing the method 400 of FIG. 4. The delayed flag corresponds to whether the mobile node will delay registration with its home agent when the mobile node travels to a foreign network at a time when there are no ongoing communication sessions. Thus, when the flag is set, the mobile node does not immediately register with its home agent when traveling to a foreign network and when there are no ongoing communication sessions. When the flag is cleared, the mobile node immediately registers with its home agent when traveling to a foreign network, regardless of whether there are any ongoing communication sessions or not. It is noted that 402 may be performed at any stage within the method 400 of FIG. 4, and is depicted as being performed at the beginning of the method 400 for illustrative convenience only.

The mobile node moves to a new foreign network (102), and receives a temporary care-of address for use while the mobile node is within this foreign network (104). If there are any ongoing communication sessions when the mobile node moves to the foreign network (106), then the mobile node immediately registers this care-of address with the home agent of its home network (108). If there are no ongoing communication sessions when the mobile node moves to the foreign network (106), and if the delayed flag is not set (404), then the mobile node still immediately registers the care-of address with the home agent of its home network (108).

However, if the delayed flag is set (404), then the mobile node does not immediately register its care-of address with the home agent of its home network. Rather, the following process is performed. If a new communication session has not been initiated by the mobile node (110), and if the mobile node has not moved to a different foreign network (406), then the method 100 repeats at 110. If the mobile node has moved to a different foreign network (406), then the method 400 is repeated beginning at 104. However, if the mobile node initiates a communication session (110), and if the current care-of address has already been registered (408), then the method 400 repeats at 406. The current care-of address may have already been registered if the mobile node had ongoing communication sessions when first entering the foreign network it currently is in, and/or if the delayed flag is cleared and not set. If the current care-of address has not yet been already registered (408), then it is registered with the home agent (108), and the method 400 again repeats at 406.

Mobile Node and Conclusion

Figure 5:
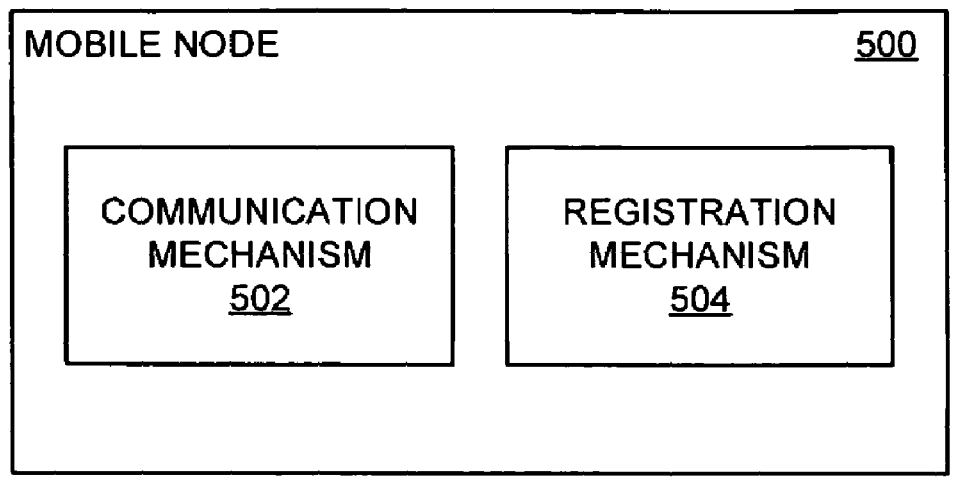
FIG. 5 is a block diagram of a rudimentary mobile node, according to an embodiment of the invention.

FIG. 5 shows a rudimentary mobile node 500, according to an embodiment of the invention. The mobile node 500 may implement any of the mobile nodes that have been described, such as the mobile nodes 206A, 206B, 206C, and 206D of FIGS. 2, 3A, 3B, 3C, and 3D. The mobile node 500 may also perform the methods 100 and 400 of FIGS. 1 and 4 that have been described. The mobile node 500 is depicted in FIG. 5 as including a communication mechanism 502 and a registration mechanism 504. As can be appreciated by those of ordinary skill within the art, the mobile node 500 may and typically will include other components, in addition to those depicted in FIG. 5.

The communication mechanism 502 includes hardware, or a combination of hardware and software, and enables the mobile node 500 to communicate with other nodes and agents, such as its home agent, and therefore enables the mobile node 500 to conduct communication sessions as have been described. Thus, the communication mechanism 502 is the mechanism of the mobile node 500 that receives a care-of address when the mobile node 500 is moved to a foreign network. The communication mechanism 502 may be include a wireless transceiver, for instance, to allow the mobile node 500 to wirelessly communicate data.

The registration mechanism 502 may be implemented in software, hardware, or a combination of hardware and software. The registration mechanism 502 is the mechanism of the mobile node 500 that registers the care-of address received when the mobile node 500 is moved to a foreign network with the home agent of the mobile node 500. As such, the registration mechanism 502 delays registration of the care-of address until a communication session is initiated while the mobile node is in the foreign network, unless the mobile node has one or more current ongoing communication sessions when moved to the foreign network, as has been described. In one embodiment, such delayed registration may be accomplished only when a corresponding flag has been set, such that when the flag is cleared and not set, registration of the care-of address with the home agent is immediately performed, and not delayed.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   in response to a mobile node moving to a foreign network, the mobile node having a home network in which the mobile node has a home address,
   receiving a care-of address within the foreign network;
   where the mobile node has no ongoing communication sessions,
      waiting to register the care-of address with a home agent of the home network until the mobile node initiates a communication session within the foreign network.

2. The method of claim 1, wherein registering the care-of address with the home agent informs the home agent where to forward data sent to the home address in accordance with the communication session.

3. The method of claim 1, further comprising, in response to the mobile node moving to the foreign network, where the mobile node has one or more ongoing communication sessions, immediately registering the care-of address with the home agent of the home network.

4. The method of claim 1, further comprising, in response to the mobile node moving to the foreign network, where a flag corresponding to whether registering with the home agent should be delayed is not set, immediately registering the care-of address with the home agent of the home network.

5. The method of claim 1, further comprising, setting a flag corresponding to whether registering with the home agent should be delayed, such that registering with the home agent is subsequently accomplished when the mobile node moves to a foreign network only if there is an ongoing communication session or when a communication session is later initiated.

6. The method of claim 1, further comprising, clearing a flag corresponding to whether registering with the home agent should be delayed, such that registering with the home agent is subsequently accomplished automatically each time the mobile need moves to a foreign network, regardless of whether there is an ongoing communication session.

7. The method of claim 1, further comprising:
   the mobile node initiating a communication session; and,
   as a result of the mobile node initiating the communication session, registering the care-of address with the home agent to inform the home agent where to forward data in conjunction with the communication session.

8. The method of claim 1, further comprising:
   the mobile node moving to another foreign network;
   receiving a new care-of address from the other foreign network;
   where the mobile node has no ongoing communication sessions,
      waiting to register the care-of address with the home agent of the home network until the mobile node initiates a communication session.

9. The method of claim 1, wherein the mobile node moving to the foreign network comprises the mobile node being powered on within the foreign network.

10. The method of claim 1, further comprising, the mobile node initially moving to the foreign network from another foreign network.

11. The method of claim 1, further comprising, the mobile node initially moving to the foreign network from the home network.

* * * * *